Nov. 22, 1966     D. A. CARNEY     3,287,569

MATRIX FOR CONTROL OF STEP MOTORS

Filed June 20, 1962     2 Sheets-Sheet 1

INVENTOR.
DUANE A. CARNEY
BY *Q. E. Hodges*
ATTY.

| A | C | B | D | ROTOR POSITION | FORWARD CHANNEL | | | | REVERSE CHANNEL | | | |
|---|---|---|---|---|---|---|---|---|---|---|---|---|
| | | | | | 33 | 34 | 35 | 36 | 56 | 57 | 58 | 59 |
| 1 | 0 | 0 | 1 | 0 | 1 | 0 | 1 | 0 | 0 | 1 | 0 | 1 |
| 1 | 0 | 1 | 0 | 90 | 0 | 1 | 0 | 1 | 1 | 0 | 0 | 1 |
| 0 | 1 | 1 | 0 | 180 | 0 | 1 | 0 | 1 | 1 | 0 | 1 | 0 |
| 0 | 1 | 0 | 1 | 270° | 1 | 0 | 0 | 1 | 0 | 1 | 1 | 0 |

INVENTOR
DUANE A. CARNEY

BY
ATTORNEY

United States Patent Office 3,287,569
Patented Nov. 22, 1966

3,287,569
MATRIX FOR CONTROL OF STEP MOTORS
Duane A. Carney, Santa Clara, Calif., assignor, by mesne assignments to the United States of America as represented by the Secretary of the Navy
Filed June 20, 1962, Ser. No. 204,307
8 Claims. (Cl. 307—88.5)

The present invention generally relates to a circuit for controlling the direction of rotation of a bi-directional step motor and more particularly to the unique integration of a logic matrix circuit and a pair of conventional bi-stable flip-flops connected in such a manner that the step motor may be selectively rotated in either direction by applying a pulse to the appropriate input terminal.

In the field of guided missiles, it has been the general practice to employ step motors to convert digital input signals to analog output signals for a various number of reasons. Although such devices and their control circuits have in the past served the purpose, they have not provided entirely satisfactory operation under all conditions of service for the reason that considerable difficulty has been experienced in the reliability of the circuit due to the large number of components previously utilized which greatly decreases the reliability of the circuit while increasing the production time and cost.

To overcome these disadvantages, the present invention contemplates a unique arrangement of a logic matrix and a pair of bi-stable flip-flops which reduce the number of components needed for the necessary logic control and utilizes solid state devices thereby greatly increasing the compactness of the circuit while increasing its reliability.

To attain this, the present invention senses various combinations of the two output states of each of the four outputs from the two flip-flops to determine which flip-flop should be "flipped" to cause the step motor to rotate in the direction indicative of the input command pulse. The sensing circuit controls the condition of a plurality of gating diodes which gate a control pulse, provided in response to a command input pulse, to the appropriate flip-flop to effect the necessary change of state. The invention receives the same type of command signals at one of two inputs representing the desired direction of rotation, the control pulse width being controlled by the voltage-time-flux saturation feature of a unique voltage-flux integration circuit.

It is, therefore, an object of the invention to provide a unique combination of a logic matrix and a pair of flip-flops which is particularly adapted to control a bi-directional step motor.

Another object is to provide a logic matrix particularly adapted to be connected to a pair of bi-stable flip-flops wherein the state of the flip-flops is alternately changed for successive input pulses.

A further object is to provide a logic matrix adapted to be connected to a pair of bi-stable flip-flops wherein the flip-flops are alternately changed in state in response to a first plurality of input pulses, the sequence of switching being reversed by application of a second plurality of input pulses.

Still another object of the present invention is to provide a pulse forming circuit, the output pulse of which is controlled by a voltage-flux integration circuit.

A still further object is to provide a logic matrix adapted to be connected to a pair of flip-flops to alternately switch the state of the pair of flip-flops while preventing spurious response as a result of the output of the flip-flops changing before the input pulse decays.

Other objects and many of the attendant advantages of this invention will be more readily appreciated as the same becomes better understood by reference to the following detailed description when considered in connection with the accompanying drawings in which like reference numerals designate like parts throughout the several views thereof and wherein.

Figure 1:
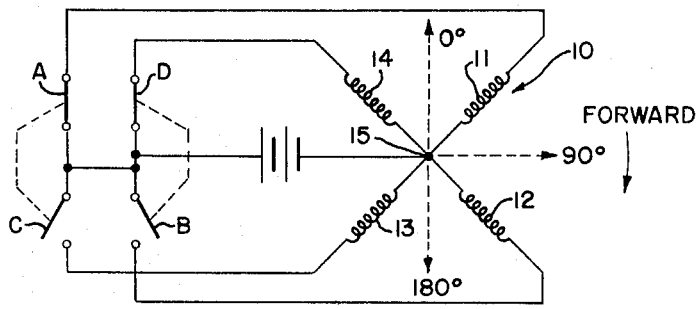
FIG. 1 illustrates a schematic diagram of a step motor and the necessary switches for its sequential operation.

Referring now to FIG. 1 there is schematically illustrated a conventional four winding step motor 10 having a permanent magnet or soft iron rotor. The field windings 11, 12, 13 and 14 are connected together at 15 and are respectively connected through switches A, B, C and D to a source of direct current. The field windings are wound in such a manner as to produce bi-directional magnetic fields along two mutually perpendicular axes and are excited in one of four combinations always involving one winding on each of the mutually perpendicular axes at any given moment, thus resulting in a discrete rotor position half way between the excited windings as illustrated by the dashed arrows.

Figures 3, 4:
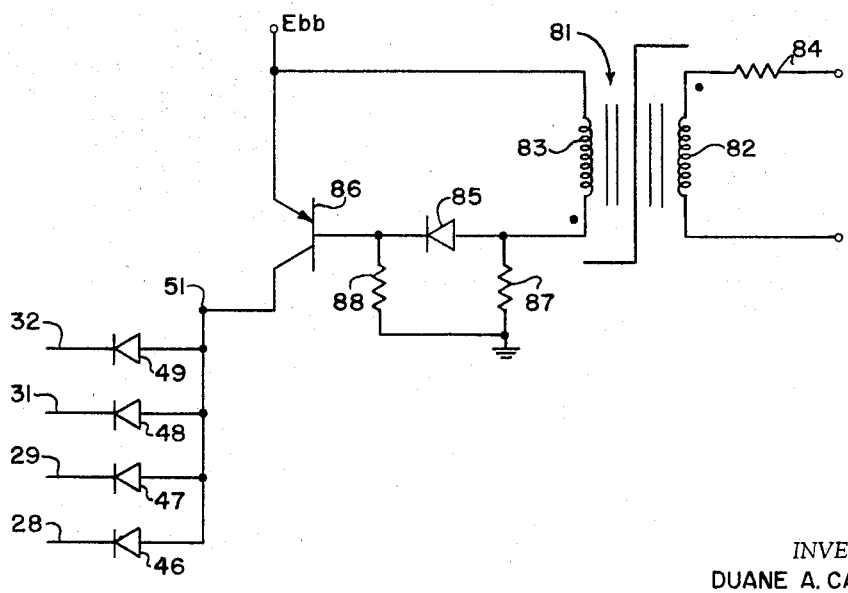
FIG. 3 is a table illustrating the conduction state of various elements in the circuit of FIG. 2 for various rotor positions of the step motor.
FIG. 4 illustrates a voltage-flux integration circuit adapted to be connected to the inputs of FIG. 2 to provide the necessary control pulses thereto.

The rotor is caused to rotate in an arbitrarily defined forward direction as illustrated by the arrow in FIG. 1 by applying D.-C. power to adjacent windings through two of the four switches in the sequential manner illustrated in the first four columns of FIG. 3. In FIG. 3 a "1" indicates the switch is closed or that the element is conductive while a "0" indicates the switch is opened or the element is nonconductive and, as illustrated, when switches A and D are closed and switches C and B are opened the resultant field lies mid-way between windings 11 and 14 of FIG. 1 and the rotor will assume this relative position which has arbitrarily been defined as the 0° position. If now switch D is opened and switch B is closed, windings 11 and 12 are energized and the rotor will move to the 90° position. Closing of switches C and B results in a magnetic field in the 180° position while closing switches C and D will result in the rotor being moved to the 270° position.

It is obvious from the table of FIG. 3 that in all cases when switch A is open, switch C is closed, and when switch C is open, switch A is closed, the same being true for switches B and D. It is obvious therefore, that switches A and C and switches B and D may readily be combined to form separate flip-flop type circuits since when one switch is closed the other is always open. Having combined switches A–C and switches B–D into respective flip-flop circuits, it is further obvious from the table of FIG. 3 that to move the rotor in the arbitrarily defined forward direction, the flip-flops must alternately change states and that the motor may be rotated in the reverse direction by reversing the sequence.

It should be noted that the state of conduction of each of the elements comprising the respective flip-flop represents the output thereof and that the combination has a discrete output for each rotor position. Thus a first progression or sequence of output states is formed when the flip-flops are alternately changed in state or "flipped" to drive the rotor in the forward direction and a second progression of output states is formed to drive the rotor in the reverse direction, the second progression progressing in a direction opposite that of the first progression.

By sensing the various outputs of the flip-flops it may be determined which flip-flop must be switched or "flipped" to move the progression to the next succeeding state if the rotor is to be driven in the forward direction and also which flip-flop must be switched to move the progression to the next preceding state if the rotor is to be driven in the reverse direction.

It is often desirable to step a step motor in the forward direction in response to a control pulse on a forward channel and to reverse the direction of rotation merely by applying a like control pulse to a reverse channel. Such a result may be accomplished by the circuit illustrated in FIG. 2 which comprises a pair of flip-flops each connected to a forward and a reverse channel in such a manner that each time a control pulse appears at the forward input terminal the flip-flops are changed in state in such a manner as to move the progression of states to the next succeeding state while when a control pulse appears at the reverse channel input the flip-flops are changed in state in such a manner as to move the progression of states to the next preceding state. Therefore, by applying a plurality of pulses to the forward channel input, the motor may be stepped sequentially in the forward direction, the direction of rotation being reversed when a control pulse appears at the reverse channel input terminal, the motor continuing to rotate in the reverse direction for each succeeding pulse on the reverse channel.

Figure 2:
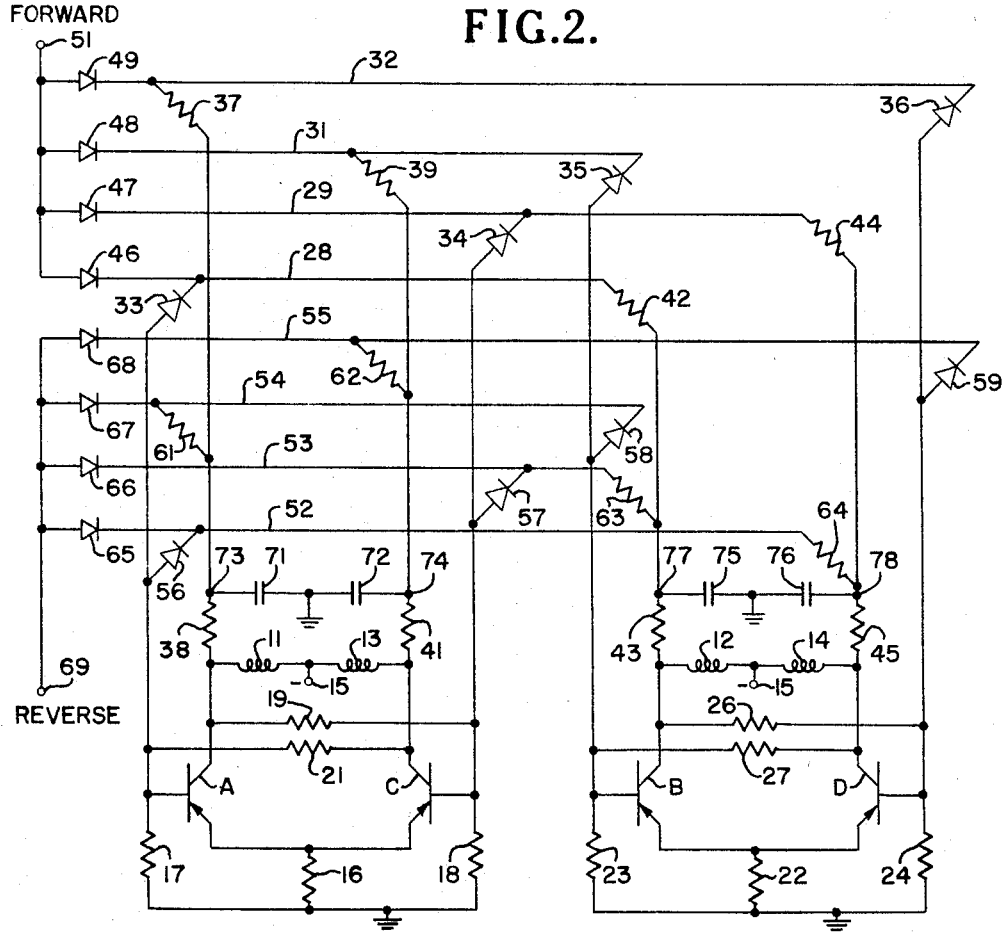
FIG. 2 illustrates a circuit diagram of one preferred embodiment of the invention.

Referring now in greater detail to FIG. 2, transistors A, C, B and D constitute the like lettered switches of FIG. 1. Transistors A and C are connected in a bistable flip-flop arrangement, the emitters of transistors A and C being connected together and through resistor 16 to ground and the bases of transistors A and C also being respectively connected through resistors 17 and 18 to ground. The collectors of transistors A and C are respectively connected through resistors 19 and 21 to the base of the opposite transistor in a well known manner. The collector of transistor A is connected through step motor field winding 11 to a source of negative potential 15 while the collector of transistor C is connected through the step motor field winding 13 to the same negative voltage.

Likewise, transistors B and D are connected in a bistable circuit having their emitters respectively connected together and through resistor 22 to a point of ground potential while their respective bases are connected through resistors 23 and 24 to ground potential. Resistors 26 and 27 respectively cross-couple the collectors of transistors B and D to the base of the opposite transistor, the collector of transistor B being connected through step motor field winding 12 and the collector of transistor D being connected through step motor field winding 14 to the point of negative potential 15. It is obvious from an inspection of the circuit that when transistors A and D are conducting, windings 11 and 14 are energized resulting in the 0° rotor position and by changing the state of flip-flop BD, windings 11 and 12 will be energized resulting in movement of the rotor to the 90° position. By now changing the state of flip-flop AC, windings 12 and 13 are energized and the rotor assumes the 180° position. Therefore, by alternately switching the flip-flops, the motor may be stepped in the forward direction and, assuming the rotor in the 180° position, that is, transistors C and B being conductive, by again "flipping" multivibrator AC the rotor will again assume the 90° position thus reversing the direction of rotation. The reverse direction of rotation will continue by now alternately switching the state of the flip-flops.

To accomplish this switching sequence there is provided a logic matrix having a forward channel and a reverse channel, each of which senses the pre-signal status of the flip-flops by sensing their respective output voltages and controls the conduction state of a plurality of gating diodes which affects the necessary change of state of the appropriate flip-flop when an input control pulse appears at the forward or reverse input terminal.

The forward channel comprises lines 28, 29, 31 and 32 to which are respectively connected the bases of transistors A, C, B and D through gating diodes 33, 34, 35 and 36. Transistor A has its collector connected to line 32 through resistors 37 and 38 and transistor C has its collector connected to line 31 through resistors 39 and 41 while transistor B has its collector connected to line 28 through resistors 42 and 43 and transistor D has its collector connected to line 29 through resistors 44 and 45. This portion of the logic matrix forms a sensing and gating circuit which is controlled by the conduction state of control diodes 46, 47, 48 and 49 having their cathodes respectively connected to lines 28, 29, 31 and 32 and their anodes each connected to the forward input channel terminal 51.

Transistors A, C, B and D also have their bases respectively connected to lines 52, 53, 54 and 55 of the reverse channel through gating diodes 56, 57, 58 and 59. The collector of transistor A is also connected to line 54 through resistors 38 and 61, the collector of transistor C is connected to line 55 through resistors 41 and 62 while the collector of transistor B is connected to line 53 through resistors 43 and 63 and the collector of transistor D is connected through resistors 45 and 64 to line 52. This portion of the logic matrix forms the sensing and gating portion of the reverse channel which is controlled by the state of conduction of control diodes 65, 66, 67 and 68. Control diodes 65, 66, 67 and 68 have their cathodes respectively connected to lines 52, 53, 54 and 55 and their anodes connected to the reverse channel input terminal 69.

Capacitors 71 and 72, serially connected between points 73 and 74 and having their common point of connection grounded, and capacitors 75 and 76, serially connected between point 77 and 78 and likewise having their common connection grounded, form a memory or delay circuit utilized as a feedback from the output of the flip-flops to the logic matrix to prevent spurious response as a result of the output from the flip-flops changing before termination of the input control signal pulse, as will hereinafter become more readily apparent as the description proceeds.

In operation, when the negative potential is applied between terminal 15 and ground, one of the transistors in each of the bi-stable flip-flops will begin to conduct due to slight dissimilarities in the characteristics of the various transistors. Let it, therefore, be assumed that transistors A and D begin to conduct and the flip-flops assume their first stable state thereby driving the rotor of the step motor to the 0° position. As is apparent to those skilled in the art, in this condition the collector of transistor C is held very close to the full negative potential applied to terminal 15, this large negative potential being applied through resistor 21 to the base of transistor A to maintain transistor A in the fully conductive condition.

The collector of transistor A will be at a relatively low negative potential, this potential being applied to the base of transistor C through resistor 19 thereby holding the base of transistor C slightly negative with respect to ground but more positive than the collector of transistor A. Since negative potentials appear on the collectors of both transistors A and C, capacitors 71 and 72 will be charged respectively through resistors 38 and 41 and, since the potential of the collector of transistor C is substantially more negative than the collector potential of transistor A, junction 74 will assume a potential that is negative with respect to the potential at junction 73. By appropriate selection of resistors 19 and 38 the base of transistor C may be held negative with respect to the potential developed at junction 73. Therefore, the bases of transistors A and C are negative with respect to junction 73 and positive with respect to junction 74 while the base of transistor C is positive with respect to the base of transistor A.

Likewise, when transistor D is conducting and transistor B is non-conducting the bases of transistors D and B are negative with respect to point 78 and positive with respect to junction 77 while the base of transistor B is positive with respect to the base of transistor D. Since the two flip-flop circuits are substantially identical, the voltages at corresponding points within the respective circuits will be approximately equal, therefore, when transistors C and B are non-conducting the bases thereof are each negative with respect to junctions 73 and 78 but positive with respect to junctions 74 and 77. Likewise, the voltage at the bases of the two conducting transistors A and D will be negative with respect to junctions 73 and 78 and positive with respect to junctions 74 and 77.

It is these voltages, i.e., the voltage at the base of each of the transistors with respect to the voltages at junctions 73, 74, 75 and 78 which determine the conduction state of gating diodes 33, 34, 35 and 36 when the blocking bias supplied thereto by the control diodes 46, 47, 48 and 49 is removed.

Under quiescent conditions a positive potential is applied to the forward channel input terminal 51 and since the cathode of each of the control diodes 46, 47, 48 and 49 is negative, the control diodes are conductive and pass a current through their respective serially connected resistors and motor windings to the negative terminal 15; for example, current is passed from terminal 51 through diode 49, resistors 37 and 38, motor winding 11 to the negative terminal 15. Since the impedance between input terminal 51 and negative terminal 15 in each of these series paths is equal the current flowing through each of the motor windings by virtue of the positive potential applied to input terminal 51 is equal and therefore has no effect on the position of the rotor 10. Conduction of diodes 46, 47, 48 and 49 respectively clamps lines 28, 29, 31 and 32 at a potential that is positive with respect to ground and, since the anodes of gating diodes 33, 34, 35 and 36 are held at the negative potential of the bases of transistors A, C, B and D respectively, these diodes are reverse biased and the bases of the flip-flops are therefore isolated from the logic matrix and are controlled only by the potential at their alternate collector.

When a command pulse is applied to the forward channel input circuit as will hereinafter be more fully described, a negative going control pulse is applied to input terminal 51 removing the positive potential therefrom and control diodes 46, 47, 48 and 49 became reversely biased since lines 28, 29, 31 and 32 will tend to assume the negative potential at junctions 73, 74, 77 and 78. If at the instant the control pulse is applied the rotor is in the zero position and transistors A and D are conductive as has been previously assumed, the potential at the bases of transistors C and D are negative with respect to the potential at junctions 73 and 78. Therefore, gating diodes 34 and 36 remain reversed biased and the control pulse has no effect on transistors C and D. However, as has been hereinbefore described, the bases of transistors A and B are positive with respect to the potential at junctions 74 and 77, therefore, gating diodes 33 and 35 become conductive tending to cause conduction of both transistors A and B. Transistor A is already conductive and therefore will remain conductive; however, closing of diode 35 drives transistor B from the non-conductive to the conductive state thereby driving transistor D to the non-conductive condition and causing flip-flop BD to "flip" in the manner well known to those skilled in the art.

Flip-flop BD being the only element switched in the circuit, it is now apparent that transistors A and B are conductive, the condition required to move the rotor to the 90° position. At the end of the input control pulse the potential at input terminal 51 returns to the positive value and control diodes 46, 47, 48 and 49 again conduct thereby clamping lines 28, 29, 31 and 32 at this positive potential cutting off gating diodes 33, 34, 35 and 36. In this state, that is, when transistors A and B are conductive and the rotor is in the 90° position, the potentials at the junctions 77 and 78 have reversed as have the potentials on the bases of transistors B and D. By an analysis similar to the preceding, it will be found that the next negative control pulse applied to the forward input terminal 51 to remove the high potential clamp from the lines 28, 29, 31 and 32, causes diodes 34 and 35 to become conductive as illustrated in the table of FIG. 3 thus tending to cause conduction in transistors B and C. Since transistor B is already conductive, the input control pulse has no effect on flip-flop BD but tends to cause conduction in transistor C which, through the regenerative action of the cross coupled connections, causes bistable flip-flop AC to change states.

Transistors B and C are now conductive, the condition required to rotate the rotor to the 180° position and as illustrated in the table of FIG. 3 under this condition diodes 34 and 36 will become conductive upon application of the next control pulse on the forward input terminal 51 which causes flip-flop BD to switch thereby bringing transistor D back into the conductive state thereby rotating the rotor to the 270° position. Upon application of the next forward channel control pulse diodes 33 and 36 are conductive, conduction of diode 33 causing flip-flop AC to again change states, causing transistor A to again become conductive, thus completing an entire cycle with the rotor in the 0° position.

A similar analysis of the reverse channel will illustrate that when transistors A and D are conducting and a negative going pulse is applied to the reverse channel input terminal 69 to remove the positive potential therefrom gating diodes 57 and 59 become conductive, conduction of diode 59 having no effect on the state of flip-flop BD while conduction of diode 57 causes transistor C to become conductive thus changing the state of flip-flop AC. Transistors C and D now being conductive it is apparent from the table of FIG. 3 that the rotor is rotated in the reverse direction to the 270° position. A complete analysis of the reverse channel in each of the discrete rotor positions will illustrate that in each position the gating diodes associated with the respective flip-flops which must be conductive to transfer the rotor to the next preceding position will become conductive when the control pulse is applied to the reverse input terminal 69 thus resulting in the change of state of the appropriate flip-flop to rotate the rotor in the reverse direction.

As is well known in the art, the switching time of the flip-flop is often much shorter than the finite duration of an input control pulse resulting therefore in the completion of the switching cycle while the control pulse is still present. Therefore, to prevent spurious response as a result of the outputs from the flip-flops changing before the control pulse decays, capacitors 71, 72, 75 and 76 constitute a memory or delay circuit for feeding back the initial output of the flip-flop to the logic matrix even after the switching has been accomplished. As a result of the delay through the charge time of these capacitors, the logic matrix senses the pre-signal status of the output of the flip-flop for the complete duration of the input control pulse. The memory circuit will assume the subsequent status prior to receipt of the next control pulse.

The logic matrix, therefore, sensing the pre-signal status of the flip-flops which defines the motor position and, under the command of the control circuit, applies a signal to the appropriate flip-flop to effect the necessary switching. The logic matrix senses the rotor position as defined by the outputs of the flip-flops and conditions each of the gating diodes in the logic matrix such that the diodes in the forward channel matrix associated with the transistors which must be conductive to define the next succeeding position will become conductive upon application of an input control pulse while those gating diodes in the reverse channel matrix associated with the bases of those transistors which must become conductive to define the next preceding position become conductive on application of a control input pulse at the reverse input terminal.

Referring now to FIG. 4 there is illustrated a voltage-flux integration circuit suitable for use as an input circuit to the forward and reverse channels. This circuit has the advantage of a flat-top, fast decay pulse which, so long as the voltage-time integration of the input pulse thereto is great enough to saturate the core, the output pulse width will always be independent of the width or time duration of the input pulse. The circuit comprises a square hysteresis loop transformer 81 having a primary winding 82 and a secondary winding 83, windings 82 and 83 being wound such that when a positive potential is applied at the dotted end of primary winding 82 a positive potential appears at the dotted end of secondary winding 83. Primary winding 82 is connected in series with a current limiting resistor 84 across a pair of input terminals to which a command pulse is applied while the secondary winding 83 is connected through diode 85 between the base and emitter of transistor 86.

The emitter of transistor 86 and one side of the primary winding 83 are connected to the source of positive potential $E_{bb}$, while the other side of winding 83 is connected through a core reset resistor 87 to a point of common potential. The base of transistor 86 is also directly coupled to the point of common potential through a base current limiting resistor 88.

In the quiescent condition, current flows from the positive terminal $E_{bb}$ through the emitter base junction of transistor 86 and current limiting resistor 88 to the point of common potential and from the positive terminal $E_{bb}$ through winding 83 and core reset resistor 87 to the point of common potential. The voltages developed across resistors 88 and 87 are such that transistor 86 is normally saturated thus essentially holding the collector thereof at the value of positive potential $E_{bb}$. The forward channel input terminal 51 is thus also close to the positive potential thus biasing control diodes 46, 47, 48 and 49 into conduction allowing current to flow therethrough as has been hereinbefore described.

When an input command pulse of such polarity as to cause a positive polarity as the dotted end of secondary winding 83 is applied across the input terminals, positive output pulse having a duration independent of the duration of the input terminals is applied between the base and the emitter of transistor 86 through diode 85. This positive pulse appearing at the base of transistor 86 drives transistor 86 into the cut-off condition thereby producing a negative going pulse at the collector of transistor 86 to disconnect the forward channel input terminal 51 from the positive potential to cut off conduction of the control diodes 46, 47, 48 and 49 which connects the logic matrix to the flip-flops as has been hereinbefore described.

When transformer 81 saturates the output pulse terminates and transistor 86 returns to the saturated condition. The core of transformer 81 is reset by current flow from the positive potential $E_{bb}$ of the power source through winding 83 and reset resistor 87 to the point of common potential. It is obvious to one skilled in the art that the point of reset of the core will be determined by the magnitude of resistor 87 and by varying the reset current, through varying the magnitude of resistor 87, the duration of the output pulse may readily be controlled. Diode 85 is poled in such a direction as to pass the transformer output pulse but is held reversely biased by the reset current passing through secondary winding 83 and resistor 87 during the reset period.

Since both the forward and reverse input control signals are negative going signals the circuit of FIG. 4 may be utilized on both channels, it also being obvious that other and different pulse circuits may be utilized to apply the control pulse to the input terminals 51 and 69 provided they are capacitively coupled to the input terminals such that terminals 51 and 69 may be held at a positive potential.

There has been illustrated and described a unique combination of a logic matrix and a pair of flip-flop circuits uniquely adapted to control the direction of rotation of a step motor through the application of a control pulse to one of two channels. It is further obvious that the logic matrix senses the pre-signal status of the flip-flops and controls a gating circuit in such a manner that for a succession of input pulses on one input channel the flip-flops are alternately switched while under any given condition when a pulse is applied to the other input channel the flip-flop which had previously been switched will again be switched before the alternate succession begins.

There has also been illustrated and described a unique voltage-time integration circuit which is utilized to provide a control pulse, the duration of which is independent of the duration of the command pulse and the magnitude of which is suitable to effect cut-off of the amplifier connected thereto.

Obviously many modifications and variations of the present invention are possible in light of the foregoing teachings. It is therefore to be understood, that within the scope of the appended claims, the invention may be practiced otherwise than as specifically described.

What is claimed as new and desired to be secured by Letters Patent of the United States is:

1. A circuit for controlling the direction of rotation of a bidirectional step motor comprising:
    a first input circuit to receive forward control pulses,
    a second input circuit to receive backward control pulses,
    a pair of flip-flops, and
    a logic matrix having a forward channel connected to said first input circuit and a reverse channel connected to said second input circuit, each of said channels sensing the pre-signal status of said flip-flops by sensing their respective output voltages, said forward channel being connected to said flip-flops to switch said flip-flops alternately in a first progression of states moving in a first direction by a succession of forward control pulses received on said first input circuit and said second channel being connected to said flip-flops to switch said flip-flops alternately in a second progression of states moving in a direction opposite said first progression by a succession of backward control pulses received on said second input circuit.

2. The combination of claim 1 wherein said logic matrix includes a rectangular diode gating matrix having
    a first plurality of input lines corresponding to said forward channel,
    a second plurality of input lines corresponding to said backward channel,
    a first plurality of diodes connecting the inputs of one of said flip-flops to first selected ones of said first and second pluralities of input lines,
    a second plurality of diodes connecting the inputs of the other said flip-flops to second selected ones exclusive of said first selected ones of said first and second pluralities of input lines, and
    biasing means connected between the outputs of said one of said flip-flops to said second selected ones of said first and second puralities of input lines and between the outputs of said other of said flip-flops to said first selected ones of said first and second pluralities of input lines for sensing the the output voltages of said pair of flip-flops and controlling the conduction states of said first and second pluralities of diodes thereby affecting the necessary change of state of the appropriate flip-flop when a control pulse appears on the first or second input circuit.

3. The combination of claim 2 further comprising storage means connected to said biasing means for storing the initial conduction state of each of said flip-flops for the duration of the pulse on said input circuits to prevent spurious response.

4. The combination of claim 3 wherein said first and second sources each comprises a saturable core having the characteristic of the rectangular hysteresis loop, a pair of windings wound on said core, one of said windings adapted to be connected to a source of command pulses, and amplifying means connected to other of said pair of windings for amplifying the command pulses.

5. The combination of claim 1 wherein said first input circuit and said second input circuit each comprises a core having a rectangular hysteresis loop, a pair of windings wound on said core, one of said windings adapted to be connected to a source of command pulses, and amplifying means connected across the other of said windings for amplifying the input pulse thereto.

6. The combination of claim 1 wherein said first input circuit and said second input circuit each comprises a saturable core having a rectangular hysteresis loop, a pair of windings wound on said core, one of said windings being connected across a pair of input terminals adapted to receive command pulses, a transistor amplifier having an emitter, a collector, and a base, a source of power connected to the emitter of said transistor amplifier and to a point of common potential, a diode having an anode and a cathode, means directly connecting said cathode to the base of said transistor amplifier, means connecting the other of said windings between the anode of said diode and the emitter of said transistor amplifier, and a reset resistor connected between the anode of said diode and said point of common potential whereby when a command pulse is applied to said input terminals the emitter-collector impedance is increased to disconnect said collector from said source of power.

7. In combination; a first input circuit and a second input circuit; each of said input circuits comprising a core having a rectangular hysteresis loop, a pair of windings wound on said core, one of said windings adapted to be connected to a source of command pulses, amplifying mean connected across the other of said windings for amplifying the command pulses; a pair of flip-flops; means connecting the output of said amplifying means of said first input circuit to said pair of flip-flops for switching said flip-flops alternately in a first progression of states moving in a first direction by a succession of pulses received from said amplifying means; and means connecting the amplifying means of said second input circuit to said pair of flip-flops for switching said flip-flops alternately in a second progression of states moving in a direction opposite said first progression by a succession of pulses received from said amplifying means.

8. In combination; a first input circuit and a second input circuit; each of said input circuits comprising a core characterized by a rectangular hysteresis loop, a pair of windings wound on said core, one of said windings being adapted to be connected to a source of command pulses, amplifying means connected across the other of said windings for amplifying the command pulses; a pair of flip-flops connected to provide a progression of output states; first means connected to the amplifier in said first input circuit and to said flip-flops for switching the state of said flip-flops alternately in response to a succession of command pulses applied thereto by the amplifier in said first input circuit; and second means connected to the amplifier in said second circuit and to said flip-flops for switching the state of said flip-flops alternately in response to a succession of input pulses applied thereto by the amplifier in said second input circuit whereby for any particular state the first pulse applied to said first means actuates one of said pair of flip-flops and the first pulse applied to said second means actuates the other of said pair of flip-flops.

References Cited by the Examiner
UNITED STATES PATENTS

| | | | |
|---|---|---|---|
| 3,017,524 | 1/1962 | Koletsky | 307—88.5 |
| 3,033,997 | 5/1962 | Salehi | 307—88.5 |
| 3,042,847 | 7/1962 | Welch | 310—49 X |
| 3,089,035 | 7/1963 | Strohmeier | 307—88 |
| 3,090,922 | 5/1963 | Diggelmann | 328—62 X |
| 3,114,843 | 12/1963 | Foglia | 307—88 |
| 3,165,684 | 1/1965 | Ensink et al. | 310—49 X |
| 3,184,663 | 5/1965 | Mergler | 310—49 X |
| 3,217,221 | 11/1965 | Heggen et al. | 310—49 X |

ARTHUR GAUSS, *Primary Examiner.*

ERVIN SRAGOW, *Examiner.*

K. J. McCLOSKEY, J. JORDAN, *Assistant Examiners.*